(12) United States Patent
Greenstein et al.

(10) Patent No.: US 6,199,176 B1
(45) Date of Patent: Mar. 6, 2001

(54) METHOD AND APPARATUS FOR STORAGE RESOURCE REASSIGNMENT UTILIZING AN INDICATOR TO ENHANCE THE LIKELIHOOD OF SUCCESSFUL RECONFIGURATION

(75) Inventors: Paul Gregory Greenstein, Fishkill; John Ted Rodell, Wappingers Falls; Danny Ray Sutherland, Poughkeepsie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 1129 days.

(21) Appl. No.: 08/589,826

(22) Filed: Jan. 22, 1996

Related U.S. Application Data (63) Continuation of application No. 08/029,641, filed on Mar. 11, 1993, now abandoned.

(51) Int. Cl.[7] .................................................. G06F 11/20
(52) U.S. Cl. .................................................................. 714/7
(58) Field of Search .................................. 714/5, 6, 7, 8, 714/710, 711

(56) References Cited

U.S. PATENT DOCUMENTS

| | | | |
|---|---|---|---|
| 3,577,185 | * | 5/1971 | Belady ................................. 395/425 |
| 3,800,294 | * | 3/1974 | Lawlor ................................. 395/575 |
| 4,430,727 | * | 2/1984 | Moore et al. ........................ 395/425 |
| 4,442,504 | * | 4/1984 | Dummermuth et al. ............ 395/725 |
| 4,888,726 | * | 12/1989 | Strager et al. ....................... 395/200 |
| 5,128,924 | * | 7/1992 | Le Bihar .............................. 370/13 |
| 5,175,830 | * | 12/1992 | Sherman et al. .................... 395/400 |
| 5,237,673 | * | 8/1993 | Orbits et al. ........................ 395/425 |
| 5,239,635 | * | 8/1993 | Stewart et al. ...................... 395/400 |

OTHER PUBLICATIONS

LY28–1442–2 "MVS/ESA Component Diagnosis & Logic: Command Processing" Part 2.
IBM Technical Disclosure Bulletin vol. 26, No. 7A, Dec. 1983 "Reconfiguration of Storage Elements to Improve Performance" by B.B. Moore, et al. pp. 3331–3332.

\* cited by examiner

*Primary Examiner*—Robert W. Beausoliel, Jr.
*Assistant Examiner*—Scott T. Baderman
(74) *Attorney, Agent, or Firm*—Lawrence D. Cutter, Esq.; Heslin & Rothenberg, P.C.

(57) ABSTRACT

An indicator is provided in a Page Frame Table Entry to identify a page frame as "Permanently Non-Preferred" (PNP). The indicator is set for page frames in storage subincrements which have locations corresponding to page frames determined to be "bad" (permanent errors) during system IPL, when reconfiguring storage on-line, or when a storage-related error occurs for such a frame during system execution. Mechanisms are provided to convert even PNP page frames to preferred status when shortages of preferred pages exist; but the mechanism used for choosing PNP frames, and for determining which PNP frames to convert to preferred status when conversion is needed, increase the likelihood of locating a target subincrement to use in copying pages from a preferred storage subincrement when the preferred storage is taken off-line.

13 Claims, 10 Drawing Sheets

SUBINCREMENT COUNTER TABLE 900

| SI_ID (901) | STATUS (902) | FRAME CT (903) |
|---|---|---|
| SI0 | P | 3 |
| SI1 | NP | 1 |
| SI2 | NP | 0 |
| SI3 | NP | 0 |
| SI4 | NP | 0 |
| SI5 | NP | 2 |
| SI6 | NP | 1 |
| SI7 | P | 2 |

Rows: 904, 905, 906, 907, 908, 909, 910, 911

FIG. 10

SUBINCREMENT IMAGE TABLE 1000

| | NBF (1010) | NPNPF (1020) |
|---|---|---|
| FRAME 0 | 1 | 2 |
| FRAME 1 | 0 | 0 |
| ⋮ | 1 | 1 |
| ⋮ | 0 | 0 |
| ⋮ | 1 | 1 |
| ⋮ | 0 | 0 |
| ⋮ | 1 | 1 |
| ⋮ | 0 | 0 |
| ⋮ | 0 | 0 |
| FRAME 11 | 0 | 0 |

FIG. 11

METHOD AND APPARATUS FOR STORAGE RESOURCE REASSIGNMENT UTILIZING AN INDICATOR TO ENHANCE THE LIKELIHOOD OF SUCCESSFUL RECONFIGURATION

This application is a continuation, of application Ser. No. 08/029,641, filed Mar. 11, 1993, now abandoned.

FIELD OF INVENTION

This invention relates to the field of computer systems, and to the management of real storage in a computer system with virtual storage capability. More particularly, it relates to the reassignment and reconfiguration of real storage during operation of the computing system.

BACKGROUND OF THE INVENTION

In many virtual storage computing systems real storage is organized in a way that allows the storage to be reconfigured dynamically during operation of the computing system. This reconfiguration typically consists of removing some part of the real storage from accessibility (taking it off-line), or adding accessibility of real storage (bringing it on-line) for the computing system's use. To facilitate this reconfigurability, the real storage is typically divided into configurable parts. For example, in IBM S/390 computing systems, real storage is divided into parts called storage elements (SEs), which are each further divided into one or more storage subincrements (SIs). Each storage subincrement is divided into one or more page frames, with all storage subincrements having the same number of page frames. Each page frame in a storage subincrement has a corresponding page frame at the exact same position (relative address from the start of the storage subincrement) in every other storage subincrement. Each page frame can contain one page of data (called a "page"). In the IBM S/390 virtual storage implementation each page is 4096 bytes (4K bytes) and each subincrement contains a minimum 256 pages (1 megabyte) of data. It is common in virtual storage computing systems to have the storage divided into pageable entities such as those described, in order to allow the operating system's paging subsystem and the computer system's dynamic address translation facilities to operate efficiently. For many reasons, (such as when storage is used for input/output buffers) some pages of data must be non-pageable (i. e., "fixed" pages). Page frames which may contain these fixed pages are identified as "preferred" page frames. These preferred page frames are the only page frames which can contain pages of data that are not to be paged out to an auxiliary storage device (and replaced with other pages of data) during operation of the computing system. Conversely, the page frames that may only contain pageable pages are called "non-preferred" page frames. A storage subincrement which contains at least one preferred page frame (and therefore can contain fixed pages) is called a preferred subincrement. (In the preferred embodiment all page frames in a preferred subincrement are preferred page frames. Other embodiments are possible in which a preferred subincrement could contain both preferred and non-preferred page frames). A storage subincrement which cannot contain any preferred page frames (and therefore cannot contain fixed pages) is called a non-preferred subincrement. Typically, if storage containing a preferred subincrement is to be taken off-line, the data contained in the preferred subincrement must be moved to a non-preferred subincrement which is remaining on-line before the real storage can be taken off-line (this is because the fixed pages in the preferred subincrement, by definition, must remain in real storage and not be paged out, while any pages in the preferred subincrement that are not fixed can be paged out). If the storage to be taken off-line contains only non-preferred storage subincrements, there is no need to move those pages to another area of real storage since they can be paged out (moved to an auxiliary storage device).

Virtual storage computing systems which support dynamic storage reconfiguration (changing the storage configuration during operation of the computing system) have the capability to do this reassignment (e.g. the storage reconfiguration capability of IBM's S/390 computing system). This capability requires the interaction and cooperation of an operating system and the hardware controlling the real storage. Commands and information describing the actions and responses required are communicated between the operating system and the hardware controlling the real storage. These capabilities have been well known in the art for some time. For example, the IBM Technical Disclosure Bulletin, Vol. 26, No. 7A, December 1983, pp 3331–3332, (RECONFIGURATION OF STORAGE ELEMENTS TO IMPROVE PERFORMANCE), describes capabilities such as these, among an operating system (MVS) and a service processor (Maintenance and Support Service Facility—MSSF) of the 3081 a member of the IBM S/370 computing system family. It describes the MVS operating system cooperating with the MSSF by communicating information about real storage address assignments, and then signalling for a reassign of the real storage addresses and a copy of the data to occur. In the art of the IBM S/390 computing system these capabilities are achieved by communication between the MVS/ESA operating system and the Service Call Logical Processor (SCLP). The Copy and Reassign Storage command of the SCLP achieves the actual reassignment and copy of data.

Uncorrectable errors within real storage can be the reason for a storage reconfiguration and can have an adverse effect on the storage reconfiguration. A "bad" page frame is one that contains uncorrectable storage errors. All page frames without uncorrectable storage errors (error free) are "good" page frames. Moving data from a good page frame into a bad page frame during reconfiguration causes the valid data contents of the good page frame to be destroyed. To avoid this destruction of page frame contents, the data in non-preferred page frames can be paged out to auxiliary storage if the corresponding page frame to which they would be copied is bad. Since fixed data in preferred page frames cannot be paged out, all preferred page frames containing fixed data in the storage subincrement(s) to be copied, must have good (without errors) corresponding page frames in the storage subincrement target of the copy. In order for the reconfiguration off-line to be successfully completed, there must exist non-preferred subincrements to which the preferred subincrements can be reassigned (copied). Additionally, since the aforementioned Copy and Reassign Storage command copies page frames to corresponding frame positions, systems using this or functionally similar mechanisms for storage reconfiguration require the non-preferred subincrements to have good page frames in corresponding positions to the page frames containing fixed data in the preferred subincrements to be copied. Otherwise the reconfiguration off-line of the storage cannot proceed. Since the ability to undergo storage reconfiguration during the operation of the computing system is dependent on the availability of non-preferred subincrements (as "targets"), some computing systems provide facilities to enhance the likelihood of successful storage reconfiguration. For example, IBM's MVS/ESA operating system provides the capability for the installation to specify a ratio of preferred to non-preferred storage to be maintained. This is achieved through use of the RSU parameter of the IEASYSXX member of the SYS1.PARMLIB data set, or by the system operator in response to the "SPECIFY SYSTEM PARAMETERS" console message. Setting this ratio can provide a balance of preferred to non-preferred storage which will enhance the chances of successful storage reconfiguration. (Additionally, some operating systems, for example IBM's MVS/ESA operating system, provide the capability to dynamically change storage from non-preferred to preferred, which is described subsequently). Failure to successfully complete a real storage reconfiguration can have severe negative impacts on the availability and operation of the computing system. For example, if the dynamic storage reconfiguration is needed to change the execution of a multiprocessor to partitioned mode from single image mode, without adversely affecting the operating system currently executing, and cannot be completed, all work in the system must be quiesced and the operating system stopped, so that the storage reconfiguration can be done manually. Additionally, a system wait state may occur if storage containing uncorrectable errors cannot be taken off-line.

SUMMARY OF THE INVENTION

An indicator associated with real storage page frames within a preferred subincrement (always "preferred" frames in the preferred embodiment, as noted above) denotes it as "Permanently Non-Preferred" (PNP), indicating that it should not be used to contain fixed data (except as a last resort). This indicator is selectively set "on" for storage page frames in potential source subincrements when damaged storage is detected in storage subincrements that may be target subincrements for copy-and-reassign functions that might operate if the potential source subincrement were later to be taken off-line. Frames for which the PNP indicator is set "on" in the potential source subincrements are those in the same relative position within those subincrements as the damaged frames in the potential target subincrements. Turning the PNP indicator "on" in the potential source subincrement will reduce the likelihood that the associated real storage page frame will be used to contain fixed data when a shortage situation occurs; and, since having a preferred storage page frame containing fixed data in the same relative position as a damaged page frame in another storage subincrement will prevent use of the other storage subincrement as the target subincrement in a copy-and-reassign function executed when the subincrement with the PNP page frame is taken off-line, use of the indicator as taught herein can be seen to improve the likelihood that potential target subincrements can be found over systems without this invention, so that successful dynamic storage reconfigurations will happen with greater frequency. Also part of the present invention are tables which indicate the reasons for marking a particular frame PNP—i.e., which indicate the number of subincrements which have damaged page frames in the same relative page position. Thus, using such a table, when a subincrement having a damaged page frame is itself taken off-line, it is then possible to "unmark" (i.e., turn the PNP indicator "off") PNP page frames which have corresponding damaged page frames ONLY in the subincrement being taken off-line.

In an alternative embodiment in which preferred subincrements can contain both preferred and non-preferred page frames (rather than just preferred page frames as in the preferred embodiment), the PNP indicator will potentially be associated with previously non-preferred page frames and will prevent arbitrary conversion of these page frames from non-preferred to preferred.

It is an object of this invention to improve the likelihood of successful storage reconfigurations when there are bad page frames within the storage.

It is further an object of this invention to positively identify page frames (via a PNP page frame indicator), within preferred subincrements, for which there are corresponding bad page frames in one or more non-preferred subincrements.

It is further an object of this invention to provide a means to remove the PNP indication for PNP page frames after all corresponding bad page frames have been reconfigured off-line.

It is further an object of this invention, when converting non-preferred storage to preferred storage, to choose non-preferred storage for conversion which has the least negative impact on future storage reconfigurations (by making use of the knowledge of PNP page frames).

DESCRIPTION OF THE PREFERRED EMBODIMENT

Figure 1:
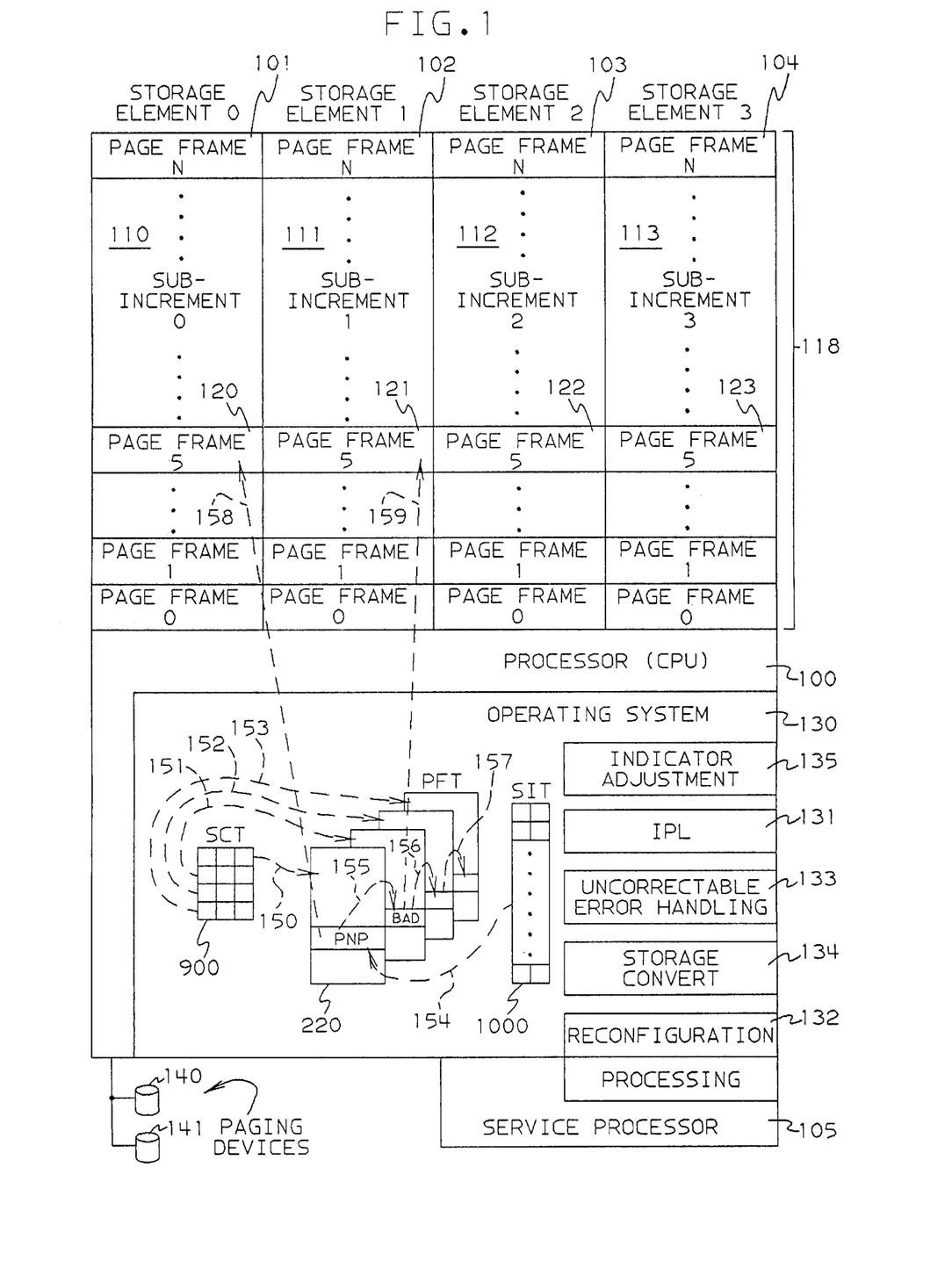
FIG. 1 is a system diagram for this invention showing a computing system consisting of a central processor under control of an operating system, reconfiguration processing means, real storage divided into storage elements, storage subincrements and page frames, with auxiliary storage used as paging devices.

The preferred embodiment, using IBM's S/390 computing system and IBM's MVS/ESA operating system, is depicted in the accompanying figures and the following description. FIG. 1 is a diagram of the operating environment for this invention. It is a virtual storage computing system comprising a processor (CPU), 100, with real storage, 118, auxiliary storage paging devices, 140, 141, and a service processor, 105 (in the preferred embodiment of IBM S/390 computing systems the service processor includes the Service Call Logical Processor function (SCLP)). The real storage, auxiliary storage and service processor are connected to the processor by conventional means. The real storage, 118, comprises storage elements (SEs), 101–104, each of which comprises a storage subincrement, 110–113. Each storage subincrement, 110–113, comprises an equal number of page frames, 120–123. For the sake of simplicity only some of the page frames are shown here within subincrements 0–3, 110–113. The processor, 100, is under control of an operating system, 130. The operating system, 130, has an IPL component, 131, an uncorrectable error handling component, 133, a storage covert mechanism, 134, an indicator adjustment mechanism, 135, and control structures, 220, 900, 1000, for managing the real storage and virtual storage. A reconfiguration mechanism, 132, for reconfiguring real storage exists, comprising functions in the service processor, 105, and the operating system, 130. The PFT, 220 (shown in detail in FIG. 2) is associated with the SCT, 900 (shown in detail in FIG. 9) and the SIT, 1000 (shown in detail in FIG. 10). The PFT, 220 is organized by subincrement, 110–113, and has an entry for each page frame, 120–123, within each subincrement. This association is illustrated by the broken lines, 158–159, from the PFT, 220 to the Page Frames, 120 and 121. The SCT, 900 has an entry for each subincrement, 110–113 and each entry is associated with the PFT as shown by the broken lines, 150–153, from the SCT, 900 to the PFT, 220. The SIT, 1000, has an entry for each page frame position in a subincrement. This association to page frames is shown by the broken line, 154, from the SIT, 1000, to the PFT, 220 and the subsequent broken lines, 155–157, within the PFT, 220, between corresponding page frame positions in each subincrement. While this preferred embodiment shows a single processor, 100, with attached storage, 118, those skilled in the art will recognize that the invention operates equally well in a multiprocessor environment that is controlled by one operating system, 130, or in an environment that is under control of a hypervisor, such as IBM's Processor Resource/System Manager, PR/SM, facility in Logically Partitioned, LPAR, mode.

Figure 4:
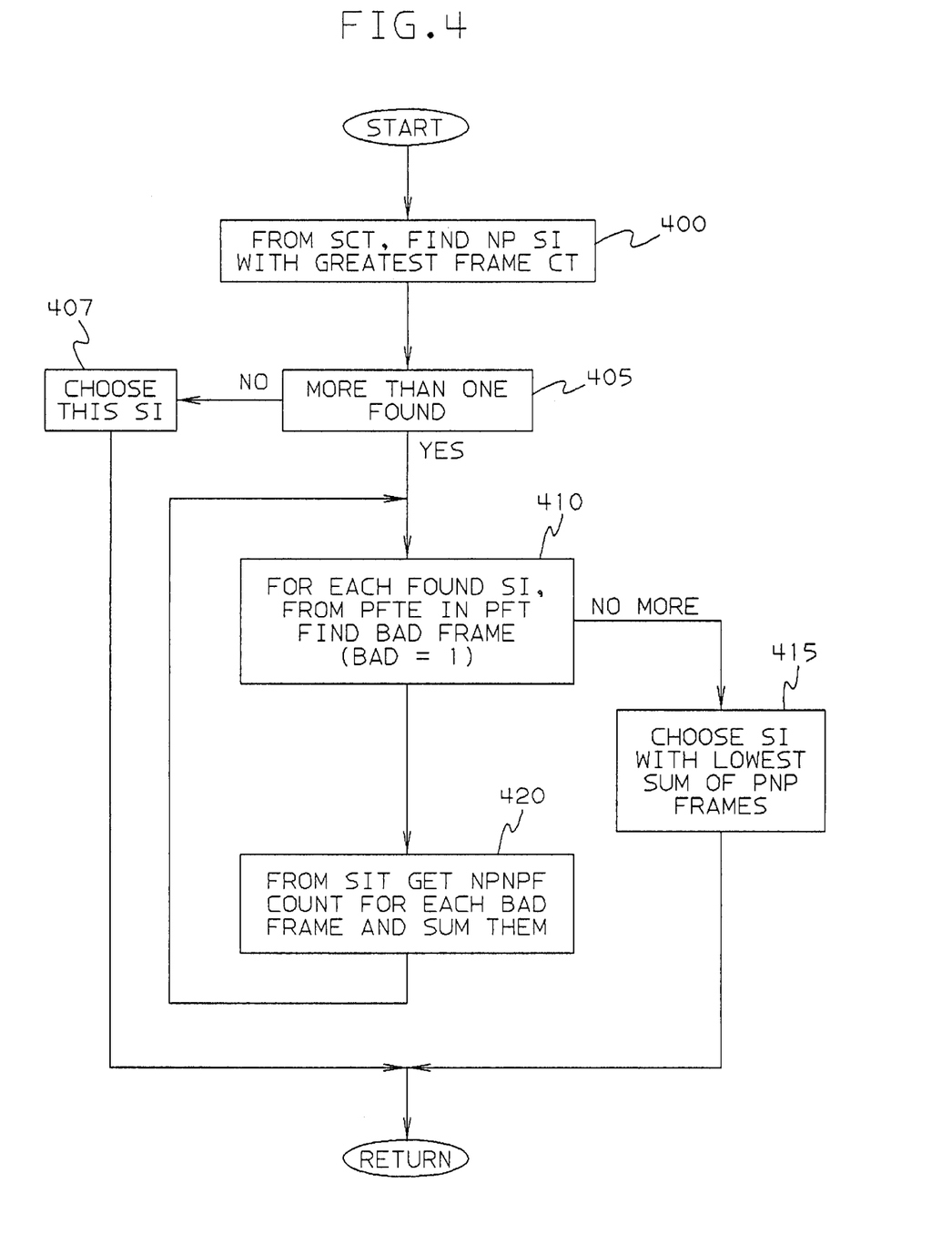
FIG. 4 is a flow diagram showing the logic for selecting a non-preferred storage subincrement for conversion to a preferred storage subincrement.
Figure 5:
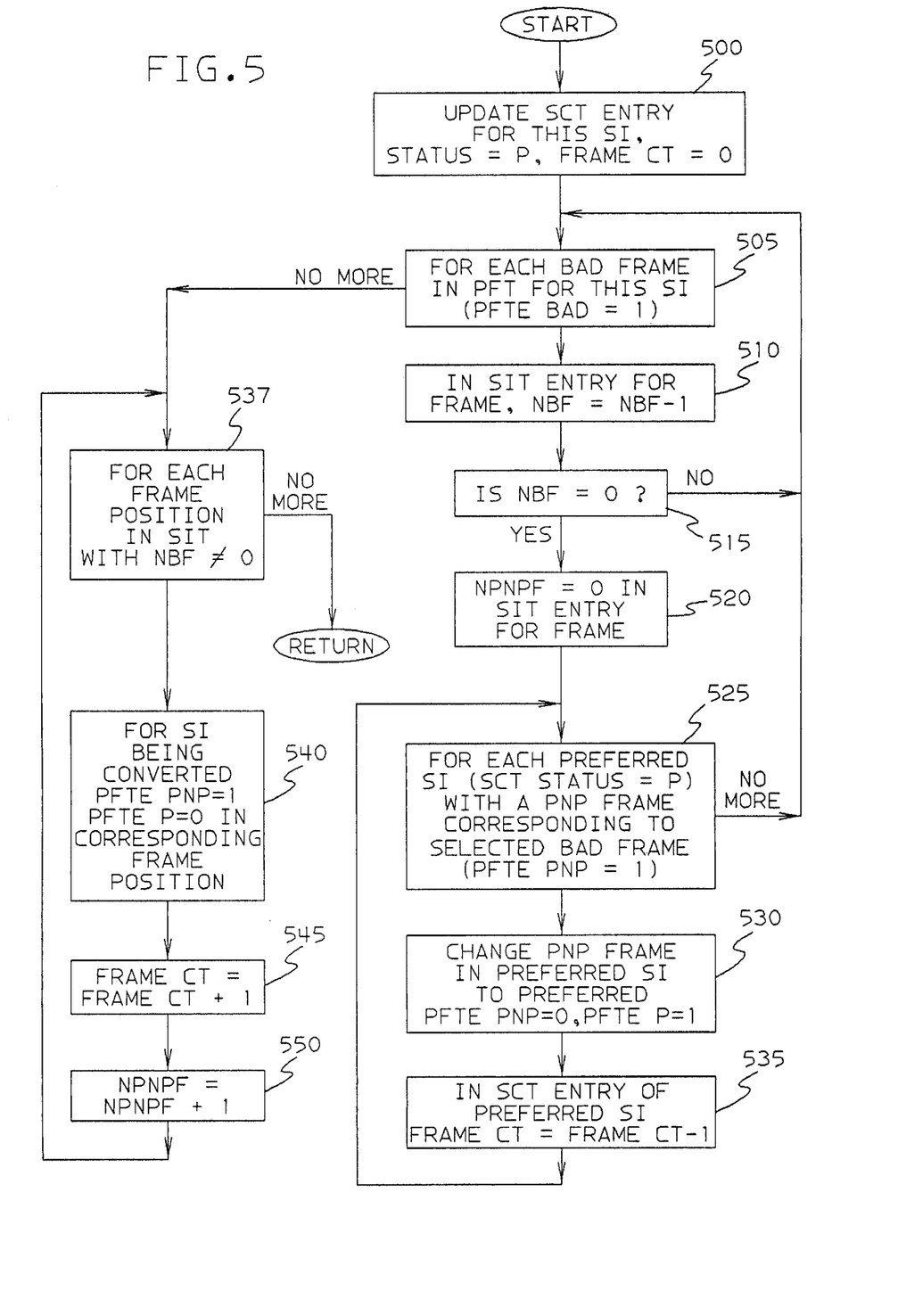
FIG. 5 is a flow diagram showing the logic for converting a selected non-preferred storage subincrement to a preferred storage subincrement.
Figure 6:
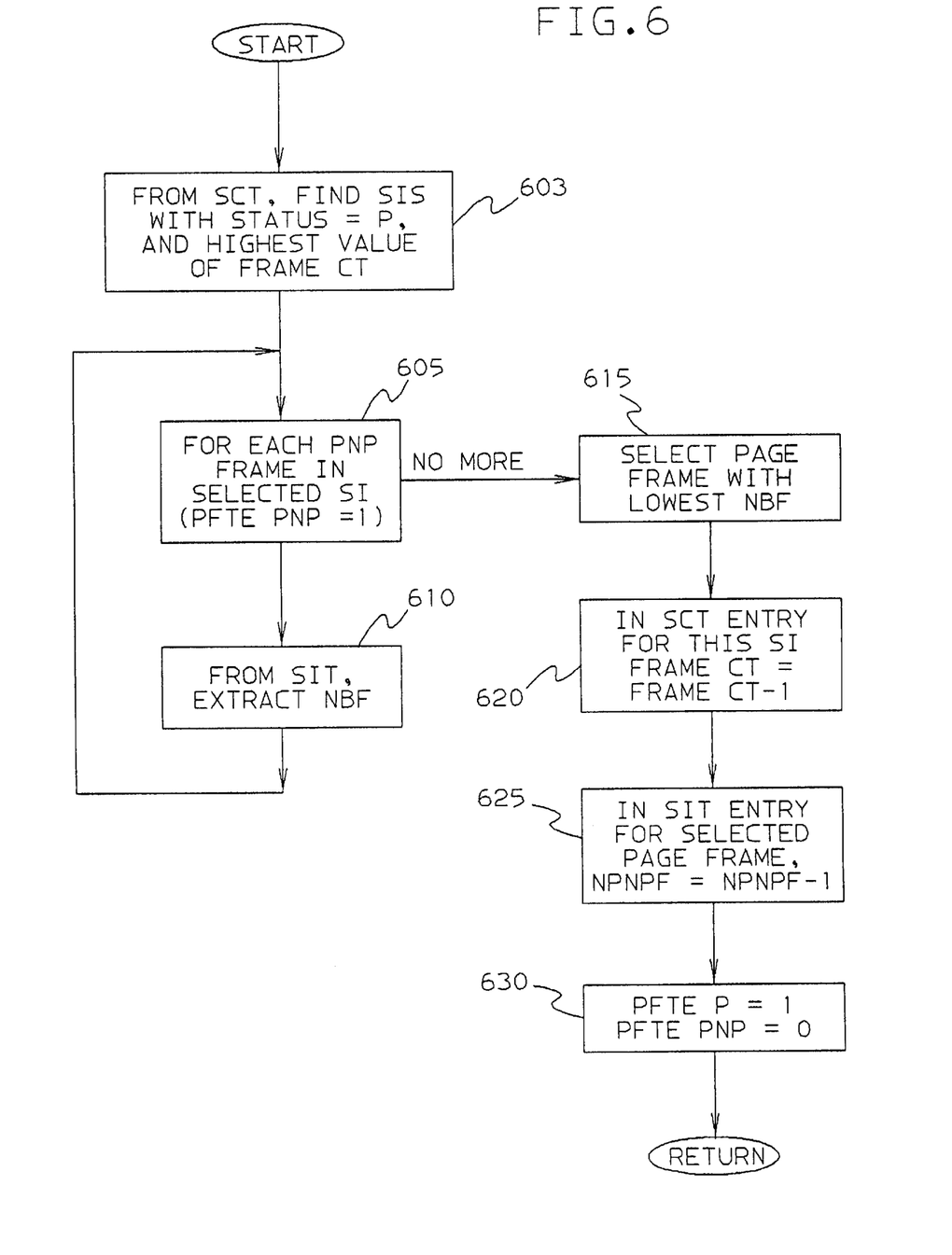
FIG. 6 is a flow diagram showing the logic for selecting a PNP page frame and converting it to a preferred page frame.
Figure 7:
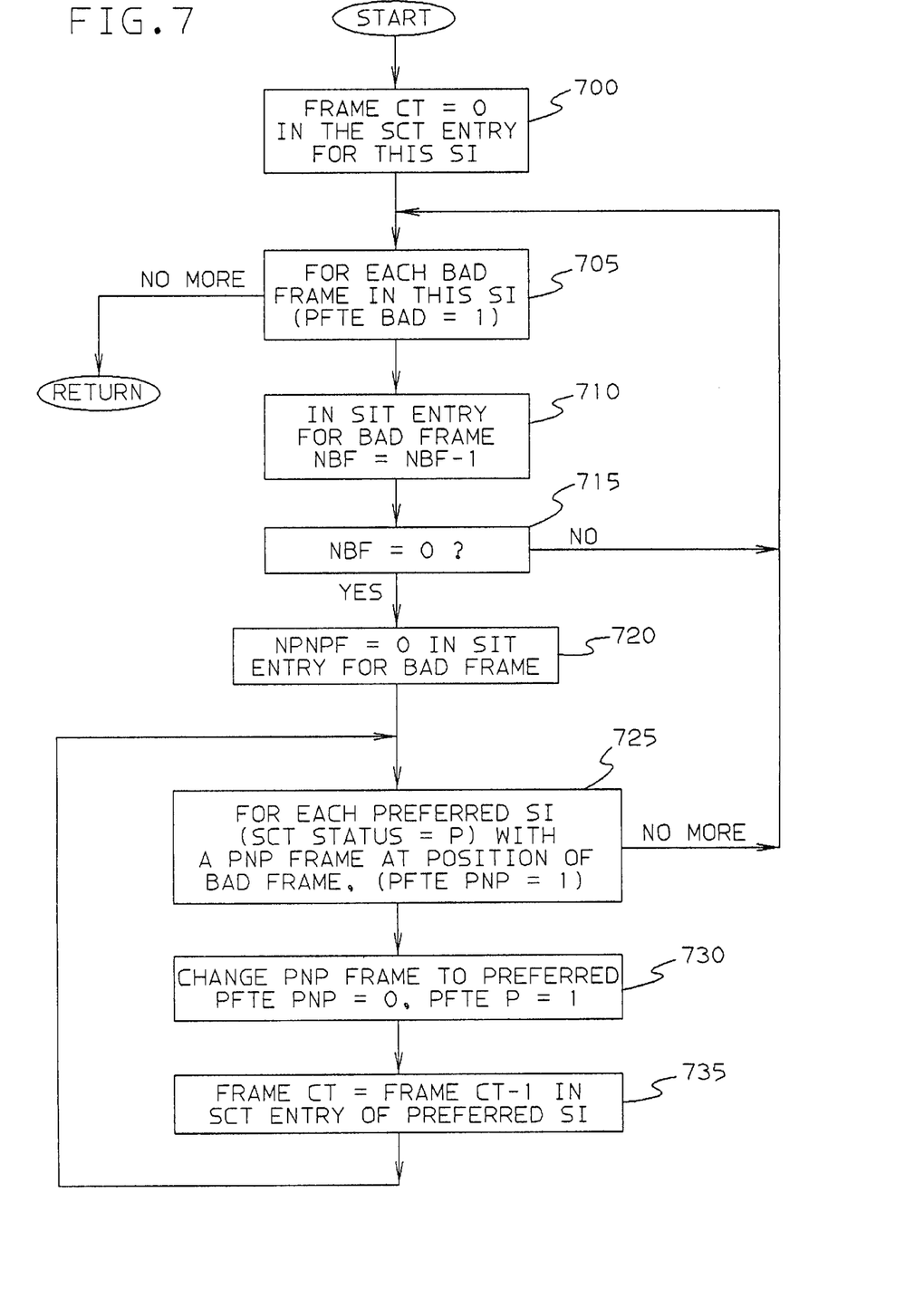
FIG. 7 is a flow diagram showing the logic for updating the table constructs for preferred storage subincrements when a non-preferred storage subincrement is reconfigured off-line.
Figure 8:
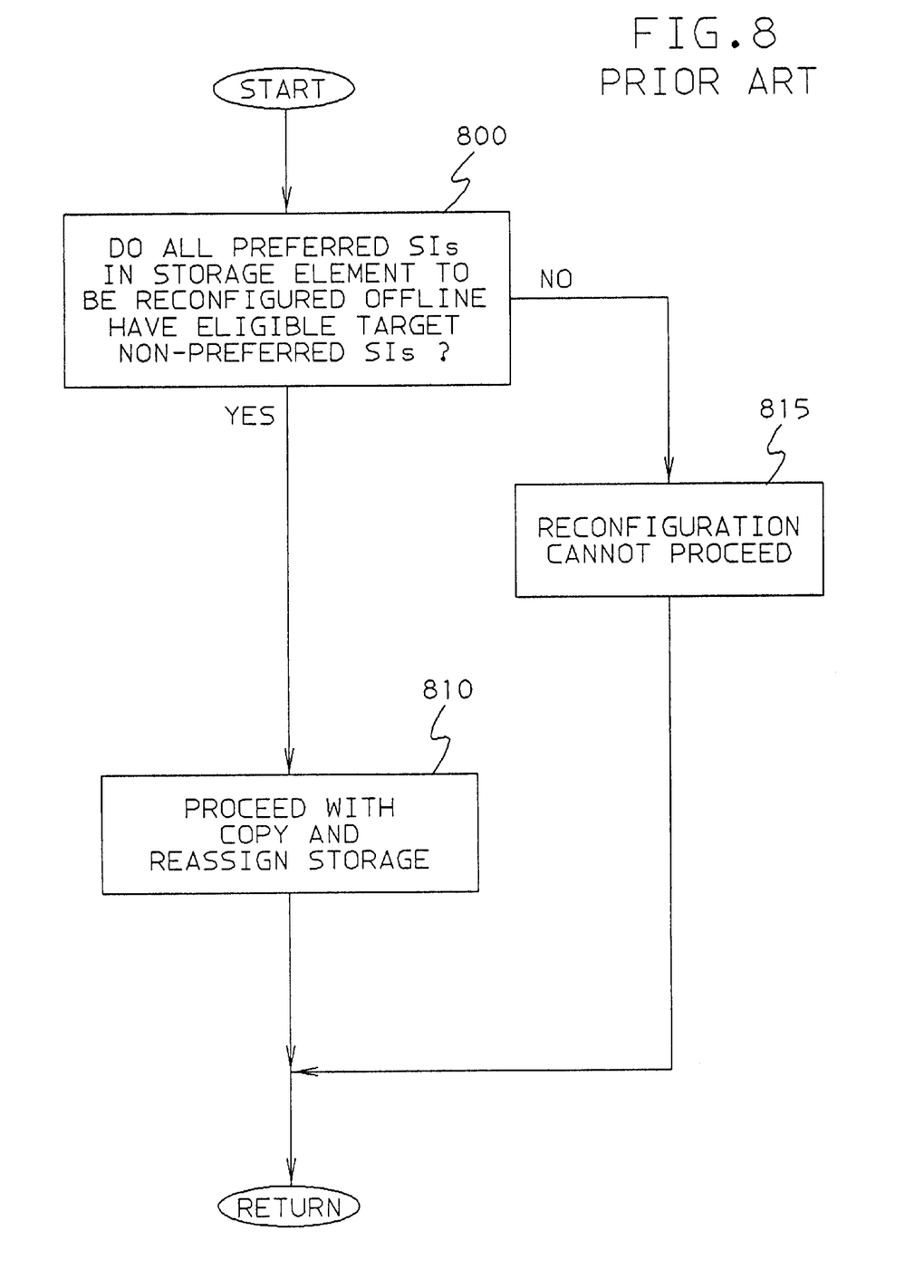
FIG. 8 is a high level flow diagram of the existing art for reconfiguration off-line processing of storage containing preferred storage subincrements.

The elements described in FIG. 1 work together to achieve the invention described herein: Error identification means comprise the operating systems IPL component (during system initialization), 131, Uncorrectable error handling component (during system operation), 133, and Reconfiguration processing mechanism (during the reconfiguration of storage on-line) 132, which identify bad page frames (as described more fully below in FIG. 3 and the supporting text). The indicator adjustment mechanism, 135, then sets the proper indicators (BAD, 228, PNP, 227) in the appropriate tables (PFT, 220, PFTE, 225) and updates the appropriate counts in the SCT, 900, and the SIT, 1000 (shown in FIG. 3). During the reconfiguration of non-preferred storage off-line, the indicator adjustment mechanism, 135, adjusts (turns "off"), as required, the PNP indicator, 227, as well as adjusting the counts in the SCT, 900 and the SIT, 1000, as required (shown in FIG. 7). During the conversion of non-preferred storage to preferred storage, the Storage convert mechanism, 134, utilizes knowledge of the location of PNP page frames, 227, in selecting the storage to convert, and the indicator adjustment mechanism, 135, adjusts the PNP indicator, 227, in the converted storage (turns "on") as required, as well as adjusting the counts in the SCT, 900, and the SIT, 1000, as required (FIGS. 4, 5, 6). Finally, during the reconfiguration of a preferred subincrement off-line, the Reconfiguration processing mechanism, 132, determines if a suitable target subincrement exists for the preferred subincrement and, if so, utilizes the Copy and Reassign Storage command of the SCLP function within the Service Processor, 105, to copy the preferred subincrement (FIG. 8). Detailed descriptions of the above processing is provided subsequently.

Figure 2:
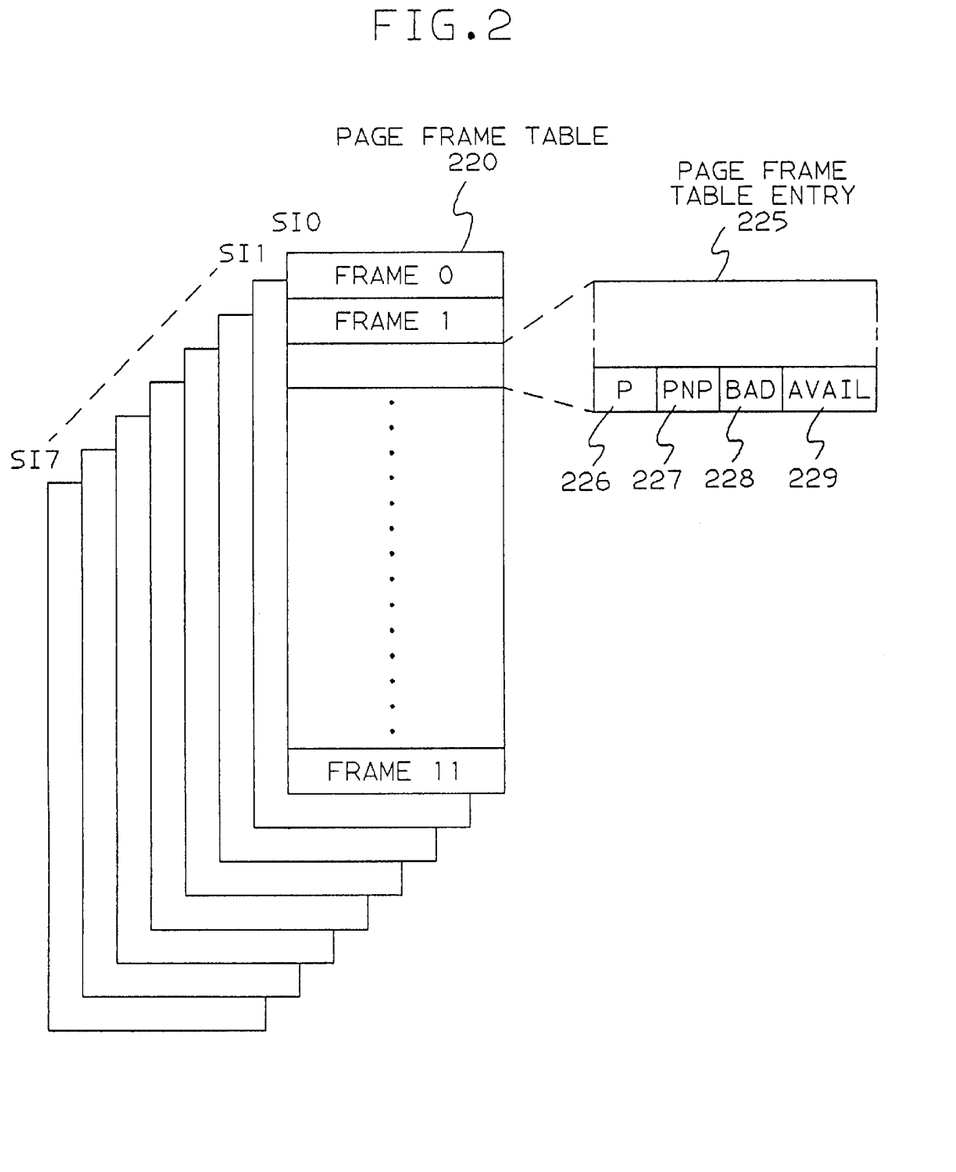
FIG. 2 is a diagram of the the Page Frame Table (PFT), and detail of the Page Frame Table Entries (PFTE) within the Page Frame Table.
Figure 9:
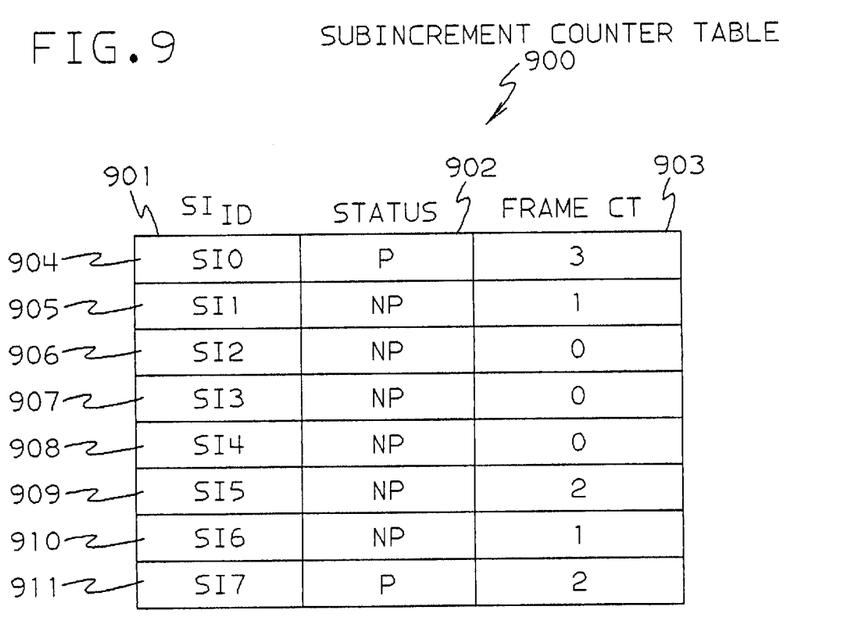
FIG. 9 is a diagram of the Subincrement Counter Table (SCT), showing its format and content. The SCT is new with this invention.
Figure 10:
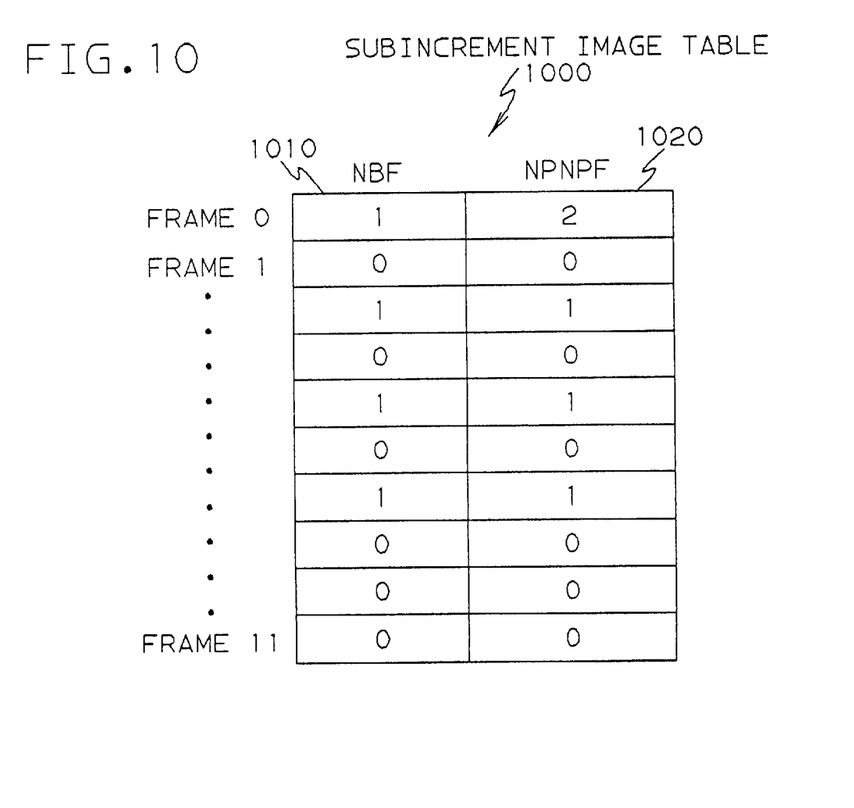
FIG. 10 is a diagram of the the Subincrement Image Table (SIT), showing its format and content. The SIT is new with this invention.

FIGS. 2,9 and 10 show detail of the content of the constructs, 220, 900, 1000, within the operating system, 130, for this invention; the page frame table (PFT), 220, consisting of page frame table entries (PFTEs), 225, the subincrement counter table (SCT), 900, and the subincrement image table (SIT), 1000. In the operating system there is one page frame table (PFT), 220, organized by storage subincrement, 110–113. Each PFTE, 225, has information pertinent to managing the page frame. Fields in the PFTE, 225, pertinent to this invention are:

BAD bit switch, 228, 1=page frame has uncorrectable errors, 0=page frame has no uncorrectable errors. This switch is part of the existing art.

AVAIL bit switch, 229, 1=page frame is available for use, 0=page frame is in use. This switch is part of the existing art.

P bit switch, 226, 1=page frame is preferred, 0=page frame is non-preferred. This switch is part of the existing art.

PNP bit switch, 227, 1=page frame is permanently non-preferred, 0=page frame is not permanently non-preferred, this switch is added with this invention.

Two tables added with this invention are the SCT, 900, and the SIT, 1000. These tables are used to keep status of PNP and "bad" page frames and in the selection of non-preferred storage for conversion to preferred. The SCT, 900, contains an entry, 904–911, for each subincrement, 110–113, in the system. The fields in each SCT entry, are:

SIid, 901,—subincrement number used as identification.

STATUS, 902,—P=subincrement is preferred, NP=subincrement is non-preferred.

FRAMECT, 903,—count of bad frames in the SI if STATUS=NP, count of PNP frames in the SI if STATUS=P.

The SIT, 1000, contains an entry for each page frame position, 120, within a storage subincrement. The fields of the SIT, 1000, are:

NBF, 1010—contains a numeric value which is the sum of the number of non-preferred frames in this frame position which have uncorrectable errors.

NPNPF, 1020—contains a numeric value which is the sum of the number of frames in this frame position which are permanently non-preferred.

Marking Page Frames Permanently Non-Preferred, PNP

This invention requires that the status of PNP page frames is kept current whenever a bad page frame in a non-preferred storage subincrement is encountered. In the existing art, with IBM's MVS/ESA operating system in an IBM S/390 processor, there are three situations when bad page frames are encountered:

1. During initial program load (IPL) of the system all real storage which is on-line is tested for bad page frames (uncorrectable errors).
2. When storage is being reconfigured on-line during the computing system's operation, that storage is tested for bad page frames.

3. During operation of the computing system, if an uncorrectable storage error occurs, an interrupt is presented to the operating system for processing.

Figure 3:
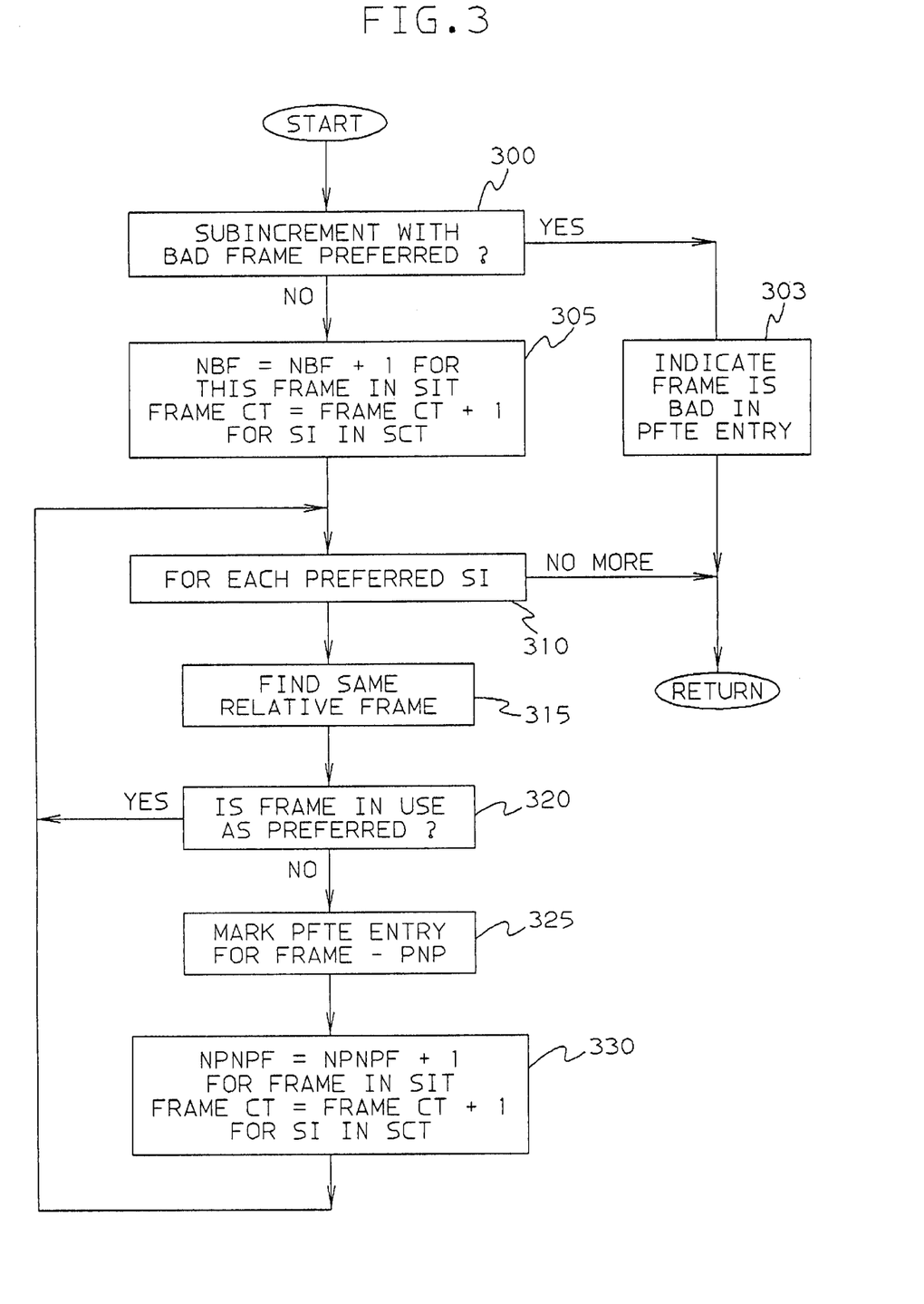
FIG. 3 is a flow diagram showing the logic for identifying and marking PNP page frames.

In each of these three cases when a bad page frame is encountered the logic depicted in FIG. 3 is executed. The purpose of the logic depicted in FIG. 3 is to insure that page frames are accurately indicated as PNP page frames and insure that the SCT, 900, and SIT, 1000, contain accurate counts. Referring to FIG. 3, (FIG. 3 at 300), if the storage subincrement containing the bad frame is a preferred subincrement, (STATUS field, 902, in the SCT, 900, is equal to P), the page frame is indicated as bad (BAD switch, 228, in the PFTE, 225,=1), and the processing is complete, (FIG. 3 at 303). In this case, (a bad page frame in a preferred subincrement), there is no need to mark the bad page frame as PNP since the fact that the page is bad will keep it from being used for fixed data. Likewise, it is also not necessary to mark the same relative position page frame in other preferred subincrements, as PNP, since this preferred subincrement can never be a target subincrement during a reconfiguration off-line (only non-preferred subincrements can be target subincrements). If the storage subincrement containing the bad frame is a non-preferred subincrement, (STATUS field, 902, in the SCT, 900, is equal to NP), then the NBF field, 1010, in the SIT, 1000, for this page frame position is incremented by 1, and the FRAMECT field, 903, in the SCT, 900, for this storage subincrement is incremented by 1, (FIG. 3 at 305). Then each preferred subincrement in the computing system is located, (FIG. 3 at 310), designated by STATUS=P in the SCT, 900 (as noted earlier, non-preferred storage subincrements cannot contain fixed data in their pages and so are not copied during a storage reconfiguration. Therefore, they do not need pages marked as PNP). For each of these preferred subincrements, the page frame in the same page frame position as the newly found bad frame is located, (FIG. 3 at 315), from the PFT, 220, for this storage subincrement. If this located page frame, corresponding to the newly found bad page frame, is available for use (indicated by AVAIL, 229,=1, in the PFTE, 225), (FIG. 3 at 320) then the PNP bit, 227, in the PFTE, 225, is set to 1, indicating this page frame is now a PNP page frame, (FIG. 3 at 325). (In an alternative embodiment, the PNP bit, 227, could also be set if the page frame was in use, but the data residing in the page was pageable (for example, not currently page fixed)). The required counts in the SIT, 1000, and the SCT, 900, are then updated as follows, the NPNPF field, 1020, is incremented by 1, and the FRAMECT field, 903, is incremented by 1, (FIG. 3 at 330). When the indicators for all preferred subincrements have been updated, processing is complete. At the end of this processing, all page frames available for use (not already containing fixed pages), in preferred subincrements, which correspond to the newly found bad page frame in a non-preferred subincrement, are indicated as PNP page frames. (Note that in the preferred embodiment all page frames in a preferred subincrement are "preferred"; thus the page frames now marked PNP were previously marked "preferred". However alternative embodiments in which the page frames were previously marked "non-preferred" are possible).

Reconfiguring Non-Preferred Storage Off-Line

When storage is to be reconfigured off-line, and that storage contains a non-preferred subincrement, PNP page frame status may have to be adjusted. FIG. 7 shows the logic, which is added to the existing reconfiguration processing with this invention, for updating the SCT, 900, the SIT, 1000, and the PFTEs, 225. In general, when a non-preferred subincrement which contains one or more bad page frames is being reconfigured off-line, PNP page frames in preferred subincrements, which are remaining on-line, may no longer need to be indicated as PNP page frames. This is the case when a bad page frame in the non-preferred subincrement being reconfigured off-line is the only bad page frame in that position within all non-preferred subincrements. Additionally, any non-preferred subincrement with one or more bad page frames being reconfigured off-line will cause the SCT, 900, and the SIT, 1000, to have the count fields updated to reflect the removal of bad page frames. Referring to FIG. 7, the FRAMECT field, 903, in the SCT, 900, for the non-preferred subincrement going off-line, is set to zero (FIG. 7 at 700). Then every bad page frame in this storage subincrement is located via the PFTES, 225 in the PFT, 220, for this storage subincrement (FIG. 7 at 705). For each bad page frame (the BAD bit, 228, equals 1 in the PFTE, 225) found, the SIT, 1000, entry for this frame position has the NBF field, 1010, decremented by 1 (FIG. 7 at 710). If the NBF field, 1010, remains non zero (FIG. 7 at 715), processing continues at block 705. Otherwise, if the NBF field, 1010, is zero (FIG. 7 at 715), PNP page frames must be changed from PNP to non PNP. The NPNPF field, 1020, in the SIT, 1000, is set to zero (FIG. 7 at 720), indicating there are no PNP page frames in this page frame position. Then, for each preferred subincrement (STATUS field, 902, in the SCT, 900, is equal to P) with a PNP page frame in the page frame position of the bad page frame (the PNP bit, 227, equals 1 in the PFTE, 225), (FIG. 7 at 725), the PNP page frame is changed to preferred (FIG. 7 at 730). This is achieved by setting the PNP bit, 227, in the PFTE, 225, to zero, and the P bit, 226, in the PFTE, 225, to 1 (FIG. 7 at 730). The FRAMECT field, 903, in the SCT, 900, entry for this preferred subincrement is decremented by 1 (FIG. 7 at 735) to indicate the removal of a PNP page frame in this storage subincrement. When the data for all preferred subincrements have been updated (FIG. 7 at 725) and all bad page frames in the non-preferred subincrement being reconfigured off-line have been handled (FIG. 7 at 705), processing is complete.

Changing Non-Preferred Storage to Preferred Storage

Figure 11:
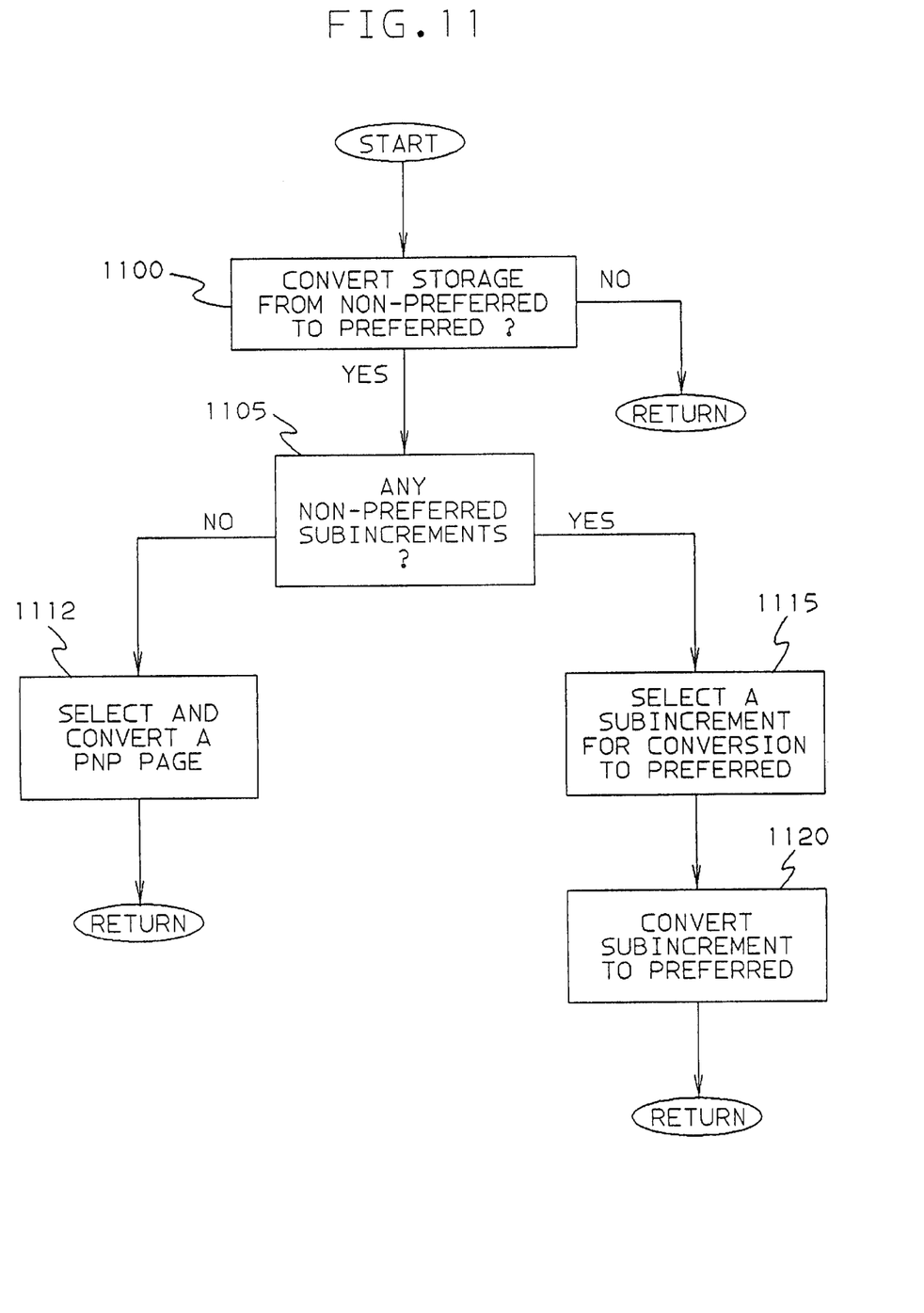
FIG. 11 is a flow diagram of the high level logic for converting non-preferred storage to preferred storage.

In the existing art, some computing systems, for availability reasons, performance reasons, or other reasons, provide the capability to dynamically change non-preferred storage to preferred storage. For example, IBM's MVS/ESA operating system has this capability. The MVS/ESA operating system, during operation, may convert storage from non-preferred to preferred when needed preferred storage is not available. An example of this occurring, in IBM's MVS/ESA operating system, is a need for more preferred storage for I/O buffers which need to be in preferred storage (non pageable). If there is the need to do I/O and preferred storage is not available, the operating system will convert non-preferred storage to preferred so that the I/O can continue and the performance of the operating system is not impaired. The choice of storage for conversion can have an effect on the success of subsequent storage reconfigurations, since eligible targets for copying preferred storage may be eliminated. With this invention, the existence of PNP page frames becomes a key part of the selection of storage for conversion to preferred. Referring to FIG. 11, the logic for converting storage to preferred is shown. If the operating system, 130, determines that non-preferred storage must be converted to preferred storage (FIG. 11 at 1100), converting a PNP page frame will be the last choice. (Note that in an alternative embodiment PNP page frames are never eligible to be converted to preferred page frames when a shortage of preferred storage is diagnosed). In the preferred embodiment, if a non-preferred subincrement exists, its storage will be the choice (FIG. 11 at 1105). If there is at least one non-preferred storage subincrement, then a non-preferred subincrement is selected for conversion (FIG. 11 at 1115). This selection is shown in greater detail in FIG. 4. After being selected, the non-preferred subincrement is then converted to preferred (FIG. 11 at 1120). This conversion of a subincrement to preferred is shown in more detail in FIG. 5. If there are no non-preferred subincrements, then a PNP page frame will be selected and converted to preferred (FIG. 11 at 1112). This selection and conversion of a PNP page frame is shown in more detail in FIG. 6.

Selecting a Non-Preferred Subincrement

In the existing art of storage management in the MVS/ESA operating system, non-preferred subincrements can be converted to preferred subincrements, when the operating system determines it requires more preferred storage. In the existing art the presence or absence of "bad" page frames does not influence the selection of the subincrement to convert. With this invention, if there are multiple non-preferred subincrements as candidates, the subincrement chosen is the one with the least chance of being a successful target during a reconfiguration off-line of a preferred subincrement. This leaves as the remaining target non-preferred subincrements, those non-preferred subincrements with the best chance of being successful targets. Referring to FIG. 4, the logic for choosing a non-preferred subincrement to convert to a preferred subincrement is shown. This logic takes into account PNP page frames thereby improving the likelihood (over the prior art) of subsequent successful storage reconfigurations. From the SCT, 900, the non-preferred subincrements with the greatest number of bad page frames (highest value of FRAMECT, 903) are found (FIG. 4 at 400). The non-preferred subincrements with the greatest number of bad pages are the most likely to be unsuccessful targets during a reconfiguration of storage. If there is only one found (FIG. 4 at 405), that one is selected (FIG. 4 at 407). Otherwise, for each of the candidate subincrements, the location of the bad page frames (BAD bit, 228, in PFTE, 225, is equal to 1) is determined (FIG. 4 at 410). The NPNPF value (number of PNP frames), 1020, is retrieved for each bad page frame position in the subincrement and the sum of all NPNPF fields, 1020, is calculated (FIG. 4 at 420). When all candidate non-preferred subincrements have had their NPNPF values, 1020, summed, the candidate non-preferred subincrement with the lowest sum is chosen (FIG. 4 at 415). This is the candidate whose bad frames have caused the fewest number of PNP page frames in preferred storage subincrements, and therefore is the most likely unsuccessful target in a subsequent reconfiguration of storage.

Converting the Subincrement to Preferred

After selecting a non-preferred subincrement to be converted to a preferred subincrement the selected subincrement is converted. Referring to FIG. 5, the STATUS field, 902, is set to P, the FRAMECT field, 903, is set to zero, in the SCT, 900, entry for this subincrement (FIG. 5 at 500). Th en every bad page frame in this storage subincrement is located via the PFTEs, 225 in the PFT, 220, for this storage subincrement (FIG. 5 at 505). For each bad page frame (the BAD bit, 228, equals 1 in the PFTE, 225) found, the SIT, 1000, entry for this frame position has the NBF field, 1010, decremented by 1 (FIG. 5 at 510). If the NBF field, 1010, remains non zero (bad page frames still exist) (FIG. 5 at 515), processing continues at block 505. Otherwise , if the NBF field, 1010, is zero (there are no longer any bad frames in this position in a non-preferred subincrement) (FIG. 5 at 515), PNP page frames in this page frame position need to be changed from PNP to non PNP. The NPNPF field, 1020, in the SIT, 1000, is set to zero (FIG. 5 at 520), indicating there are no PNP page frames in this page frame position. Then, for each preferred subincrement (STATUS field, 902, in the SCT, 900, is equal to P) with a PNP page frame (PNP bit, 227, in PFTE, 225, is equal to 1) in the page frame position of the bad page frame (FIG. 5 at 525), the PNP page frame is changed to preferred (FIG. 5 at 530). This is achieved by setting the PNP bit, 227, in the PFTE, 225, to zero, and the P bit, 226, in the PFTE, 225, to 1 (FIG. 5 at 530). The FRAMECT field, 903, in the SCT, 900, entry for this preferred subincrement is decremented by 1 (FIG. 5 at 535) to indicate the removal of a PNP page frame in this storage subincrement. When the tables for all preferred subincrements have been updated (FIG. 5 at 525), processing continues at block 505. When all bad page frames within this subincrement being converted have been processed, (FIG. 5 at 505) processing continues at block 537. Since this storage subincrement is now a preferred subincrement, any page frames corresponding to bad page frames in non-preferred subincrements must become PNP page frames. Each frame position in the SIT, 1000, with a non zero NBF field (indicating there are bad frames in this position), 1010, is located (FIG. 5 at 537). For each frame position located, the PFTE, 225, for this converted preferred subincrement is updated as follows, the PNP bit, 227, is set to 1, the P bit, 226, is set to zero (FIG. 5 at 540). The FRAMECT field, 903, in the SCT, 900, entry for this subincrement is incremented by 1 (FIG. 5 at 545) and the NPNPF field, 1020, in the SIT, 1000, entry for this frame is incremented by 1 (FIG. 5 at 550). When all entries in the SIT, 1000, with a non zero NBF field, 1010, have been handled, processing is complete (FIG. 5 at 537).

Converting a PNP Page Frame to Preferred

As described previously, during the operation of the computing system the operating system may determine, within the existing art, that conversion of non-preferred storage to preferred storage is required. As described previously, a PNP page frame is the last choice for conversion to preferred. A non-preferred storage subincrement will be converted if one exists. Otherwise, a PNP page frame will be converted. (Note that in an alternative embodiment PNP page frames are never eligible to be converted to preferred page frames when a shortage of preferred storage is diagnosed). A PNP page frame indicates that at least one bad non-preferred page frame exists in that page frame position. Therefore, PNP page frames are the last to be considered for conversion, since this lessens the chances for subsequent successful storage reconfigurations. When a PNP page frame is to be converted to a preferred page frame, the PNP page frame chosen is the one with the most good (and therefore the least bad) non-preferred page frames in that page frame position. This choice allows the greatest possibility of a successful subsequent reconfiguration of this preferred subincrement. Referring to FIG. 6, the logic for the selection and conversion of a PNP page frame to preferred is shown. From the SCT, 900, all preferred subincrements (STATUS, 902, equal to P) with the highest value of FRAMECT, 903, are selected (FIG. 6 at 603). For every PNP page frame (PFTE, 225, PNP bit, 227, equal to 1), within the selected preferred subincrements (FIG. 6 at 605), the value in the NBF field, 1010, of the SIT, 1000, is retrieved (FIG. 6 at 610). When the values of the NBF field, 1010, for all PNP page frames in the selected preferred subincrements have been selected, the page frame with the lowest NBF field, 1010, value is chosen (FIG. 6 at 615). For the selected PNP page frame, the FRAMECT field, 903, in the SCT, 900, for the preferred subincrement containing the chosen PNP page frame, is decremented by 1 (FIG. 6 at 620). The NPNPF field, 1020, in the SIT, 1000, for the selected page frame position is decremented by 1 (FIG. 6 at 625). The P bit, 226, is set to 1 and the PNP bit, 227, is set to zero, signifying this page frame is now a preferred page frame (FIG. 6 at 630).

PNP Page Frames in Storage Reconfigured Off-Line

When preferred subincrements are to be reconfigured off-line, the fixed data in this storage must be moved to storage which is remaining on-line. This requires the interaction and cooperation of the operating system, 130, and the service processor, 105, (via SCLP commands to the service processor). Commands and information describing the actions and responses required are communicated between the operating system 130, and the service processor, 105, in ways that are well known in the art. Exemplary mechanisms are found for example, in the following co-pending patent applications, incorporated herein by reference, and assigned to the assignee of the present invention: Ser. No. 07/732,985, METHOD AND APPARATUS FOR ASYNCHRONOUS COMMUNICATION OF CHANGED PROCESSING CAPABILITY, by Mary B. Crisman, et al., filed Jul. 19, 1991 which describes the interaction between a control program and a service processor via Service Call Logical Processor (SCLP) commands providing the capability to directly communicate changes in processor capability; Ser. No. 07/963,498 SYSTEM AND METHOD FOR PERFORMING RESOURCE RECONFIGURATION IN A COMPUTER SYSTEM, by B. Glendening, et al. filed Oct. 19, 1992, which describes the cooperation of an operating system and a Service Call Logical Processor (SCLP) to configure and deconfigure physical resources such as a CPU.

In IBM S/390 processors the moving of the preferred subincrement is accomplished by the Copy and Reassign Storage command of the Service Call Logical Processor (SCLP). The reconfiguration off-line processing, in the existing art, determines if there are target non-preferred subincrements which can be used to house preferred subincrements. To be a suitable target non-preferred subincrement, there must be good page frames for receipt of all preferred page frames in the subincrement needing to be moved. If there are suitable targets for all source subincrements needing to be moved then reconfiguration continues with the paging out of the data in the target non-preferred subincrement(s) and the move of the data in the source preferred subincrements(s) to the non-preferred subincrement(s) which are remaining on-line. Otherwise the reconfiguration will not be done. With the invention described here, the existence of PNP pages in the preferred subincrement being reconfigured off-line greatly improves the likelihood of successful reconfiguration. FIG. 8 shows the high level logic in the existing art, for reconfiguring preferred storage off-line. Referring to FIG. 8, all of the preferred subincrements in the storage which is being reconfigured off-line must have eligible target non-preferred subincrements for receipt of the data from the preferred subincrements (FIG. 8 at 800). In IBM's MVS/ESA operating system this is accomplished by matching bit patterns of preferred page frames in the source preferred subincrements with bit patterns of "bad" page frames in the potential target non-preferred subincrements. If a preferred source subincrement has at least one eligible target, the best target is selected to be the receiver. The best target is determined by picking the preferred source subincrement with the most restrictive list of eligible targets (fewest eligible target non-preferred subincrements), then selecting, from among the eligible targets, the target subincrement with the most restrictive list of eligible source subincrements (fewest number of eligible sources). This prior art logic is described in available IBM publications, "LY28-1442-02 MVS/ESA Component Diagnosis and Logic: Command Processing." All preferred page frames in the source subincrements must be matched with error free page frames in the target subincrements for the reconfiguration to be completed. If a target non-preferred subincrement does not exist for each preferred subincrement to be moved then the reconfiguration cannot occur (FIG. 8 at 800, 815), otherwise, processing continues at block 810. The Copy and Reassign Storage command is then issued (FIG. 8 at 810). Through this invention, the recognition of a bad page frame in a non-preferred subincrement caused the corresponding page frames in preferred subincrements to be indicated as PNP. The PNP page frame becomes an unlikely candidate to be converted to preferred, thereby maintaining the non-preferred subincrements with "bad" page frames as viable targets.

The invention claimed is:

1. A computer system comprising:
   a. one or more central processing units;
   b. real storage linked to said one or more central processing units, said real storage comprising two or more reconfigurable storage entities, each of said two or more reconfigurable storage entities comprising one or more addressable entities, each of said one or more addressable entities having a first associated indicator indicating one of two associated status states, a first state or a second state, said first state being "non-preferred", designating that the associated addressable entity should not contain fixed data, and said second state being "preferred", designating that the associated addressable entity may contain fixed data;
   c. reconfiguration processing means for reconfiguring one of said two or more reconfigurable storage entities off-line, said reconfiguration processing means comprising means for copying contents of said one of said two or more reconfigurable storage entities to a second of said two or more reconfigurable storage entities; and
   d. reconfiguration enhancement means for increasing the likelihood of successful reconfiguration of said one of said two or more reconfigurable storage entities by said reconfiguration processing means, said reconfiguration enhancement means comprising identification means for identifying a damaged one of said addressable entities and a selected one of said addressable entities having a relation to said damaged one of said addressable entities, said damaged one and said selected one of said addressable entities residing in different reconfigurable storage entities; indicator means for indicating when "on" that said selected one of said one or more addressable entities be in said first, "non-preferred" state; and indicator adjustment means for turning "on" said indicator means in response to said identifying of said damaged one of said addressable entities by said identification means because of said relation between said damaged one of said addressable entities and said selected one of said addressable entities, wherein turning "on" said indicator means enhances probability of future successful reconfiguration of said one of said two or more reconfigurable storage entities by said reconfiguration processing means if said one of said two or more reconfigurable storage entities and said second of said two or more reconfigurable storage entities contain said damaged one of said addressable entities and said selected one of said addressable entities.

2. The system of claim 1 in which said reconfigurable storage entity is a storage subincrement, and in which said relation is a relationship of identical location of said damaged one and said selected one within respective reconfigurable storage entities.

3. The system of claim 2 in which each of two or more reconfigurable storage entities has a second associated indicator indicating one of two associated status states, a first status state or a second status state, said first status state being "non-preferred", designating that the associated reconfigurable storage entity should not contain fixed data, and said second status state being "preferred", designating that the associated reconfigurable storage entity may contain fixed data.

4. The system of claim 3 in which said indicator adjustment means further comprises reverse adjustment means for adjusting to "off" said indicator means for said selected one of said addressable entities to indicate that said selected one of said addressable entities need no longer be in said first state, when said damaged one of said addressable entities resides in said one of said two or more reconfigurable storage entities being reconfigured off-line.

5. The system of claim 4 further comprising table means for associating a total number of damaged addressable entities with each "on" indicator means.

6. The system of claim 5 in which said table means comprises a subincrement counter table and a subincrement image table.

7. The system of claim 3 further comprising storage convert means for obtaining additional storage which may contain fixed pages when required.

8. The system of claim 7 in which said storage convert means comprises:
   a. non-preferred reconfigurable storage entity convert means for converting a non-preferred reconfigurable storage entity to a preferred reconfigurable storage entity; and
   b. indicated addressable entity convert means for converting to a preferred addressable storage entity said selected one of said addressable storage entities having said indicator means "on" when no non-preferred reconfigurable storage entities exist.

9. The system of claim 8 in which said non-preferred reconfigurable storage entity convert means comprises initial selection means for selecting said non-preferred reconfigurable storage entity having a maximum number of said one or more damaged addressable entities for said converting.

10. The system of claim 9 in which said non-preferred reconfigurable storage entity convert means further comprises source adjustment means for adjusting all of said indicator means both in said reconfigurable storage entity selected by said initial selection means, and in all of said preferred reconfigurable storage entities, to reflect that said selected reconfigurable storage entity can no longer be a target, but can now be a source, for said copying by said reconfiguration means.

11. A method for enhancing the likelihood of successful off-line reconfiguration of one of two or more reconfigurable storage entities in a system comprising one or more central processing units, real storage linked to said one or more central processing units, said real storage comprising said two or more reconfigurable storage entities, each of said two or more reconfigurable storage entities comprising one or more addressable entities, each of said one or more addressable entities having at least two status states, a first state and a second state, said first state being "non-preferred", designating that an associated addressable entity should not contain fixed data, and said second state being "preferred", designating that the associated addressable entity may contain fixed data, and each of said two or more reconfigurable storage entities having at least two status states, a first status state being "non-preferred", designating that an associated reconfigurable storage entity should not contain fixed data, and a second status state being "preferred", designating that the associated reconfigurable storage entity may contain fixed data, said method comprising the steps of:
   a. detecting an uncorrectable storage error in a damaged one of said one or more addressable entities in a first of said two or more reconfigurable storage entities;
   b. locating a second of said two or more reconfigurable storage entities, said second of said two or more reconfigurable storage entities being a potential source entity for a storage reassign function between said second and said first of said two or more reconfigurable storage entities;
   c. locating a same relative addressable entity in said second of said two or more reconfigurable storage entities, said same relative addressable entity having a same relative position within said second of said two or more reconfigurable storage entities as has said damaged one of said one or more addressable entities within said first of said two or more reconfigurable storage entities, and
   d. turning on an indicator associated with said same relative addressable entity if said same relative addressable entity does not contain "fixed" data, said indicator indicating that said same relative addressable entity should not be used to contain fixed data.

12. The method of claim 11 further comprising the steps of:
   a. determining that an additional one or more of said addressable storage entities capable of containing fixed data are required;
   b. converting one of said reconfigurable storage entities from said first status state to said second status state if there is at least one of said reconfigurable storage entities in said first status state; and
   c. turning "off" said indicator associated with said same relative addressable entity so that said same relative addressable entity can contain fixed data, if there was not at least one of said reconfigurable storage entities in said first status state.

13. The method of claim 11 further comprising the steps of:
   a. reconfiguring said first of said two or more reconfigurable storage entities offline; and
   b. adjusting said indicator by turning said indicator off if no addressable entities in any of said reconfigurable storage entities remaining on-line, having said same relative position as said damaged one of said one or more addressable entities, have uncorrectable storage errors.

* * * * *